UNITED STATES PATENT OFFICE.

ALEXANDER DICKSON, OF DUBLIN, IRELAND.

MANUFACTURE OF PHOSPHATE COMPOUNDS FOR MANURES AND FERTILIZERS.

1,132,171. Specification of Letters Patent. Patented Mar. 16, 1915.

No Drawing. Application filed September 12, 1914. Serial No. 861,450.

*To all whom it may concern:*

Be it known that I, ALEXANDER DICKSON, a subject of His Majesty the King of England, residing at 15 Parliament street, in the city and county of Dublin, Ireland, have invented certain new and useful Improvements in the Manufacture of Phosphate Compounds for Manures and Fertilizers, of which the following is a specification.

This invention relates to improvements in the manufacture of manures and fertilizers containing phosphate compounds and it has particular reference to the method of producing available phosphates by combining with the recovered solids from sewage waste and the like.

As is well known the precipitated and separated solids of sewage known as sludge contain a small percentage of organic acids. These acids become concentrated during the process of desiccation and if, as according to the present invention, a quantity of insoluble phosphate such as phosphate rock be added to the sludge before desiccation, the before mentioned concentrated acids will effect an alteration in the character of the phosphate and produce a material containing phosphate in a form available for plant life. Suitable salts such as sulfate of potash, sulfate of soda, sulfate of magnesia may be added to enrich the resulting product. The desiccation and chemical reaction is preferably effected at such a temperature as will not destroy the organic constituents of the sludge and in practice temperatures from 400° to 600° Fahr. have been found effective. In conjunction with the organic contents of the sludge a fertilizer is then obtained containing nitrogen, potash, and available phosphates together with a considerable quantity of organic matter of the nature of humus.

In practice good results may be obtained by employing one ton of sewage sludge containing about 80% of moisture which is mixed with about 3 cwt. of finely ground phosphate. The mass is then passed in the wet condition to a drier where it is desiccated.

I am aware that it has previously been proposed, in order to enrich or improve the value of sewage sludge, to add thereto phosphates with or without other chemicals, but according to the present invention insoluble phosphate is employed in connection with the desiccation of sludge and a chemical action takes place between the concentrated acids in the sludge and the phosphate thereby producing an available phosphate.

What I claim as my invention and desire to secure by Letters Patent of the United States is:—

1. In a manure or fertilizer the method of producing available phosphates from insoluble phosphates according to which the insoluble phosphates are added to the recovered solids from sewage waste and the like and the mass is then subjected to desiccation effected at such a temperature as will not destroy the organic constituents of the sludge whereby to concentrate the acids to such degree as to re-act upon the phosphates and render such phosphates available for the purpose described.

2. In a manure or fertilizer the method of producing available phosphates from insoluble phosphates according to which the insoluble phosphates are added to the recovered solids from sewage waste and the like and the mass is then subjected to desiccation effected in a temperature between 400° and 600° Fr. substantially as and for the purpose described.

In testimony whereof I have signed this specification in the presence of two subscribing witnesses.

ALEXANDER DICKSON.

Witnesses:
 K. SHANAGHED,
 WILLIAM GARDNER HILL.